US012088609B1

(12) United States Patent
Boteanu et al.

(10) Patent No.: US 12,088,609 B1
(45) Date of Patent: Sep. 10, 2024

(54) INVESTIGATIVE PLAYBOOKS FOR CLOUD SECURITY EVENTS

(71) Applicant: Amazon Technologies, Inc., Seattle, WA (US)

(72) Inventors: Adrian Boteanu, Belmont, MA (US); Rima S. Tanash, Brooklyn, NY (US); Ruslan Vaulin, Holliston, MA (US); Brent Andrew Maynard, Newton Highlands, MA (US); Stephen Clifford Lazzaro, Auburndale, MA (US); Yue Zhu, Newark, CA (US); Rohan Satyavan Mestri, Charlestown, MA (US); Prateek Madapurmath, Austin, TX (US); Bryan Matthew Lynch, Chicago, IL (US); Nir Shalom Soudry, Needham, MA (US); Zachary Joseph Michaels, Mountain View, CA (US); Guiquan Sun, Allston, MA (US); Michael Buciuman-Coman, South Boston, MA (US)

(73) Assignee: Amazon Technologies, Inc., Seattle, WA (US)

( * ) Notice: Subject to any disclaimer, the term of this patent is extended or adjusted under 35 U.S.C. 154(b) by 355 days.

(21) Appl. No.: 17/488,758

(22) Filed: Sep. 29, 2021

(51) Int. Cl.
*H04L 9/40* (2022.01)
(52) U.S. Cl.
CPC ...... *H04L 63/1425* (2013.01); *H04L 63/1433* (2013.01); *H04L 63/20* (2013.01)

(58) Field of Classification Search
CPC .. H04L 63/1425; H04L 63/1433; H04L 63/20
See application file for complete search history.

(56) References Cited

U.S. PATENT DOCUMENTS

| | | | |
|---|---|---|---|
| 10,419,480 B1* | 9/2019 | Tkach | H04L 63/1416 |
| 10,938,828 B1* | 3/2021 | Badawy | G06N 5/022 |
| 2015/0169392 A1* | 6/2015 | MacKay | G06F 9/541 709/217 |
| 2016/0021138 A1* | 1/2016 | McGloin | G06F 16/1744 726/23 |
| 2016/0315954 A1* | 10/2016 | Peterson | H04L 63/1425 |
| 2017/0093897 A1* | 3/2017 | Cochin | H04L 63/145 |
| 2019/0020667 A1* | 1/2019 | Parker | H04L 63/107 |
| 2019/0098037 A1* | 3/2019 | Shenoy, Jr. | H04L 63/1441 |
| 2019/0188121 A1* | 6/2019 | Simon | G06Q 20/0855 |
| 2019/0245877 A1* | 8/2019 | Toth | H04L 63/1425 |
| 2019/0318100 A1* | 10/2019 | Bhatia | G06F 21/57 |
| 2019/0342311 A1* | 11/2019 | Muddu | H04L 43/045 |

(Continued)

*Primary Examiner* — Darshan I Dhruv
(74) *Attorney, Agent, or Firm* — NICHOLSON DE VOS WEBSTER & ELLIOTT LLP

(57) ABSTRACT

Techniques for generating and utilizing investigative playbooks for cloud security events are described. Activity is detected indicative of a potential compromise in association with a resource of a multi-tenant cloud provider network. API calls originated by a client are determined to utilize API methods that exist within a set of known API methods included in a formal model of attack tactics. Responsive to both the detection and the determination, an investigative playbook is executed, based on the activity, that includes multiple logical tests to generate an attack report that can be presented to a user such as a security analyst for use in investigating cloud security events.

20 Claims, 13 Drawing Sheets

(56) References Cited

U.S. PATENT DOCUMENTS

| | | | |
|---|---|---|---|
| 2020/0112571 A1* | 4/2020 | Koral | G06N 3/08 |
| 2020/0213336 A1* | 7/2020 | Yu | H04L 63/1425 |
| 2021/0136089 A1* | 5/2021 | Costea | G06F 21/56 |
| 2021/0211459 A1* | 7/2021 | Kanemoto | H04L 63/1491 |
| 2021/0241355 A1* | 8/2021 | Low | H04L 9/3263 |
| 2021/0273961 A1* | 9/2021 | Humphrey | H04L 63/1425 |
| 2023/0086281 A1* | 3/2023 | Kaidi | H04L 63/20 726/22 |

* cited by examiner

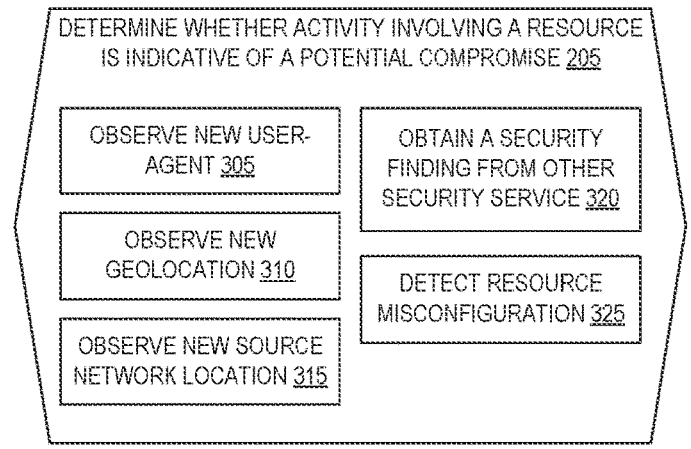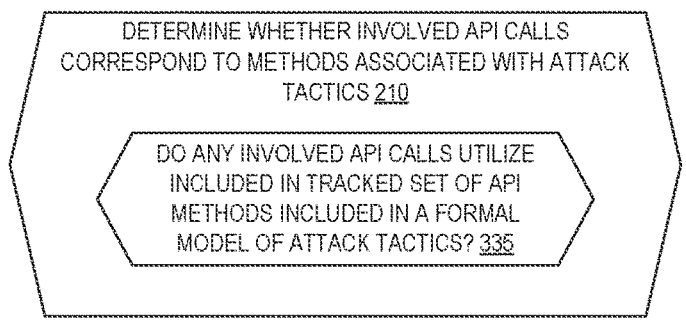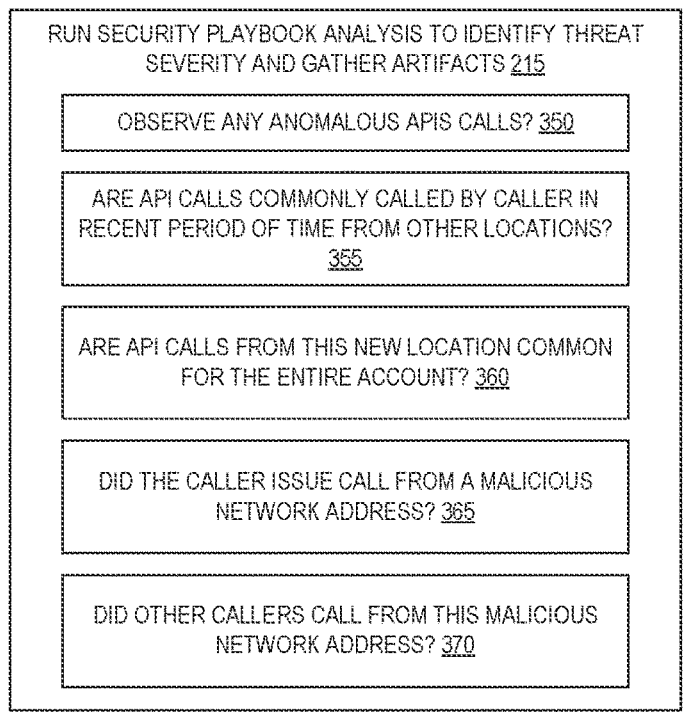
FIG. 3

800

DETAILED
REPORT
705

```
SECURITY INVESTIGATION SERVICE                         USER: RSINGH
                                                       COMPANY-X
RESOURCE X – INVESTIGATORY PLAYBOOK DETAILED REPORT

┌──────────┬───────────────┬──────────────────┐
   │ SUMMARY  │ ATTACK REPORT │ DETAILED         │
   │          │               │ ATTACK REPORT    │
   ├──────────┴───────────────┴──────────────────┤
   │ ### INTRO ###                               │
   │                                             │
   │                                             │
   │ Starting playbook for the following principal and time scope
   │ RoleSession AROAIOJRFK4IOK6BW5ISY:JohnDoe-Project
   │ Time scope: 2021-07-15 05:05:35 2021-07-16 05:05:35
   │
   │
   │ ### PHASE 1 ###
   │
   │
   │ Collecting indicators of concern and other data: findings,
   │ API calls, new geolocations, new user agents, new ASN
   │
   │ Found 1 new GeoLocation
   │ Found 1 new UserAgent
   │ Found 1 new ASO
   │ Found 3 findings
```

*FIG. 7*

SECURITY INVESTIGATION SERVICE      USER: RSINGH
COMPANY-X

*RESOURCE X – INVESTIGATORY PLAYBOOK DETAILED REPORT*

| SUMMARY | ATTACK REPORT | DETAILED ATTACK REPORT |

```
PHASE 2 ###

Mappings API calls to known TTPs
Security API activity with matching known related activity
for the same PID or IP API storage_service:PutFolderPublicAccessBlock maps to the
High severity tactic:
{ 'subTechnique': 'Folders permissions',
  'tactic': 'Impact',
  'technique': 'Identity and Access Management (IAM)
manipulation'}
It was invoked from IP 72.21.196.65 and PID
ASIAXTKM3VWIZKTTUVH3
We found the following related activity from the same IP,
72.21.196.65, which indicates this tactic may have been
executed
storage_service:GetFolderAcl called 1 times API storage_service:GetFolderPolicy maps to the High
severity tactic:
{ 'subTechnique': 'Folders permissions',
  'tactic': 'Discovery',
  'technique': 'Identity and Access Management (IAM)
Discovery'}
It was invoked from IP 72.21.196.69 and PID
ASIAXTKM3VWIZKTTUVH3
We found the following related activity from the same IP,
72.21.196.69, which indicates this tactic may have been
executed
storage_service:GetFolderPublicAccessBlock called 2 times
storage_service:GetFolderAcl called 2 times API storage_service:DeleteFolder maps to the High severity
tactic:
{ 'subTechnique': 'Folder and object destruction',
  'tactic': 'Impact',
  'technique': 'Data Destruction'}
It was invoked from IP 72.21.196.69 and PID
ASIAXTKM3VWIZKTTUVH3
We found no other prior or post API activity indicating that
the tactic may have been executed
```

*FIG. 8*

SECURITY INVESTIGATION SERVICE     👤 USER: RSINGH
    COMPANY-X

*RESOURCE X – INVESTIGATORY PLAYBOOK DETAILED REPORT*

| SUMMARY | ATTACK REPORT | DETAILED ATTACK REPORT |

```
PHASE 3 ###

RoleSession used new location US,Ashburn,39.0,-77.5. This
location is common for the entire account.

RoleSession used new AS COMPANYX-NW-02. This AS is common
for the entire account.

The IP 72.21.198.69 is malicious because it was involved in
a finding. It was used for these resources:
[ {'instanceId': 'AROA3XOKQC74Y347WI6F3', 'type': 'Role'},
  {'instanceId': 'AROAI6YXRN3NYIV3LJKWA', 'type': 'Role'},
  {'instanceId': 'AROAIOJRFK4IOK6BW5ISY', 'type': 'Role'},
  {'instanceId': 'AROATWIEW4YTKL574VZA2', 'type': 'Role'}]

The IP 72.21.196.65 is malicious because it was involved in
a finding. It was used for these resources:
[ {'instanceId': 'AROA3XOKQC7457LZYRL53', 'type': 'Role'},
  {'instanceId': 'AROA3XOKQC74Y347WI6F3', 'type': 'Role'},
  {'instanceId': '522536594833', 'type': 'Account'},
  {'instanceId': '806267918329', 'type': 'Account'}]

The IP 72.21.196.69 is malicious because it was involved in
a finding. It was used for these resources:
[ {'instanceId': 'AROA3XOKQC74Y347WI6F3', 'type': 'Role'},
  {'instanceId': 'AROAI6YXRN3NYIV3LJKWA', 'type': 'Role'},
  {'instanceId': 'AROAIOJRFK4IOK6BW5ISY', 'type': 'Role'}]

Other IPs used by the RoleSession are involved in Findings.
We observed a total of 6 distinct APIs that are indicators
of possible attack tactic execution The proportions of tactics by type:
Impact : Identity and Access Management (IAM) manipulation :
Storage Service Folders permissions 2
Discovery : Identity and Access Management (IAM) Discovery :
Storage Service Folders permissions 9
Impact : Data Destruction : Storage Service Folder and
object destruction 2

In addition, there were a total of 276 additional API
invocations that are related to executing tactics
```

*FIG. 9*

INVESTIGATIVE PLAYBOOKS FOR CLOUD SECURITY EVENTS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

BRIEF DESCRIPTION OF DRAWINGS

Various embodiments in accordance with the present disclosure will be described with reference to the drawings, in which:

FIG. 3 is a diagram illustrating exemplary lower-level operations for generating investigative playbooks for cloud security events according to some embodiments.

FIG. 7 is a diagram illustrating exemplary output from a first phase of the execution of an investigative playbook for cloud security events according to some embodiments.

FIG. 8 is a diagram illustrating exemplary output from a second phase of the execution of an investigative playbook for cloud security events according to some embodiments.

FIG. 9 is a diagram illustrating exemplary output from a third phase of the execution of an investigative playbook for cloud security events according to some embodiments.

DETAILED DESCRIPTION

The present disclosure relates to methods, apparatus, systems, and non-transitory computer-readable storage media for generating and utilizing investigative playbooks for cloud security events. According to some embodiments, a security investigation service implemented in a cloud provider network can generate intelligent security reports, via the use of investigative playbooks, to present contextualized information to allow users the ability to quickly and easily investigate cloud-based security incidents and determine which, if any, remediation actions should be performed in response.

Large-scale providers of online computing services—such as "cloud" provider networks—typically utilize many computing devices across many different geographic locations to execute processes and services for its users. Its users, in turn, may also use large numbers of computing resources and services provided by these provider networks, such as fleets of virtual machines or containers, storage locations and objects stored therein, databases, on-demand functions, users and groups of users, custom access permissions, and the like. However, the large-scale deployment of many types and numbers of computing resources—which vary over time in type and size—creates a significant challenge to ensure the security, confidentiality, and integrity of these resources.

Figure 1:
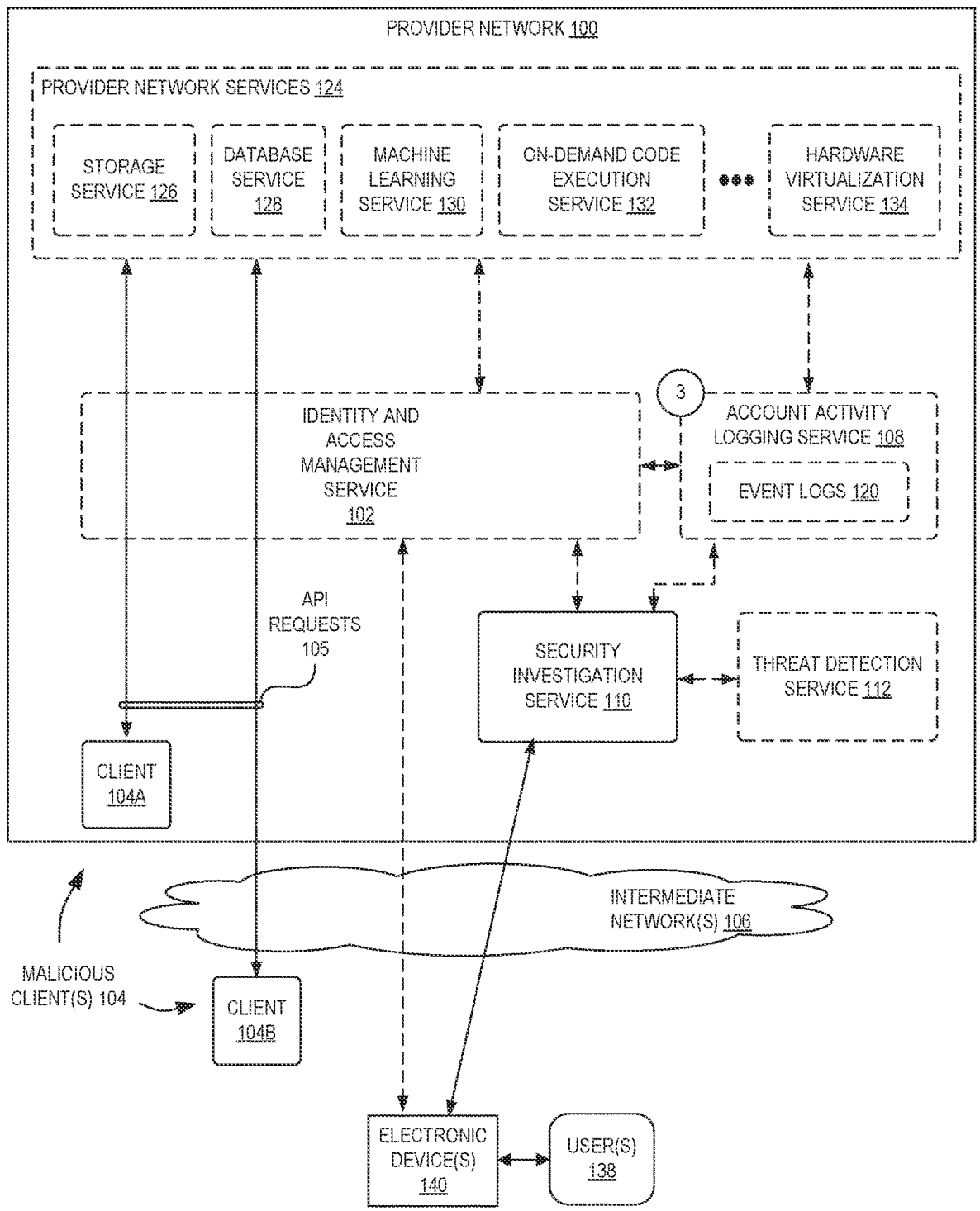
FIG. 1 is a diagram illustrating an environment for generating and utilizing investigative playbooks for cloud security events according to some embodiments.

For example, FIG. 1 is a diagram illustrating an environment for generating and utilizing investigative playbooks for cloud security events according to some embodiments. In FIG. 1, a multi-tenant cloud provider network 100 is shown with a variety of services 124 implemented and offered to its users 138, such as a storage service 126, database service 128, machine learning (ML) service 130, on-demand code execution service 132, hardware virtualization service 134, and the like. The provider network 100 may also implement other "supporting" services, such as an identity and access management (IAM) service 102, account activity logging service 108, a threat detection service 112, and a security investigation service 110. Any or all of these services may be implemented as software, hardware, or a combination of both.

A provider network 100 (or, "cloud" provider network) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service 134 that can execute compute instances, a storage service 126 that can store data objects, etc. Users 138 (or "customers") of provider networks 100 can use one or more user accounts that are associated with a customer account, though these terms can be used somewhat interchangeably depending upon the context of use—for example, an organizational account (e.g., for an entire company or a group or division of the company) may be associated with one or likely numerous different user accounts that may access or use certain services/resources shared between those user accounts.

Users 138, via use of an electronic device 140 such as a personal computer, server device, mobile device, or the like, can interact with a provider network 100 across one or more intermediate networks 106 (e.g., the internet) via one or more interface(s), such as through use of application programming interface (API) calls, via a console implemented as a website or application, etc. An API refers to an interface and/or communication protocol between a client (e.g., a software module executed by an electronic computing device, such as a web browser or other application) and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane of the provider network 100 that includes "backend" services supporting and enabling the services that can be more directly offered to customers. APIs commonly have methods (or actions) indicating a particular action or function requested to be performed, though the term "API method," "API," "API call," and the like are often used interchangeably by those of skill in the art.

Thus, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

To provide these and other computing resource services, provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code—typically without the user having any control of or knowledge of the underlying compute instance(s) involved.

For example, in various embodiments, a "serverless" function can include code provided by a user or other entity—such as the provider network itself—that can be executed on demand. Serverless functions can be maintained within a provider network by an on-demand code execution service 132 (alternatively called a function compute service, functions service, cloud functions service, functions as a service, or serverless computing service) and can be associated with a particular user or account or can be generally accessible to multiple users/accounts. A serverless function can be associated with a Uniform Resource Locator (URL), Uniform Resource Identifier (URI), or other reference, which can be used to invoke the serverless function. A serverless function can be executed by a compute resource, such as a virtual machine, container, etc., when triggered or invoked. In some embodiments, a serverless function can be invoked through an API call or a specially formatted Hyper-Text Transport Protocol (HTTP) request message. For example, a user can use the on-demand code execution service 116 by uploading their code and use one or more APIs to request that the service 116 identify, provision, and manage any resources required to run the code. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources can be maintained in a "ready" state (e.g., having a pre-initialized runtime environment configured to execute the serverless functions), allowing the serverless functions to be executed in near real-time.

A hardware virtualization service 134 (referred to in various implementations as an elastic compute service, a virtual machines service, a computing cloud service, a compute engine, or a cloud compute service) can enable users of the provider network 100 to provision and manage compute resources such as virtual machine instances. Virtual machine technology can use one physical server to run the equivalent of many servers (each of which is called a virtual machine), for example using a hypervisor, which can run on an offload card of the server (e.g., a card connected via PCI or PCIe to the physical CPUs) and other components of the virtualization host can be used for some virtualization management components. Such an offload card of the host can include one or more CPUs that are not available to user instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

A container service (not illustrated) can be a container orchestration and management service (referred to in various implementations as a container service, cloud container service, container engine, or container cloud service) that allows users of the cloud provider network to instantiate and manage containers. In some embodiments the container service can be a Kubernetes-based container orchestration and management service (referred to in various implementations as a container service for Kubernetes, Azure Kubernetes service, IBM cloud Kubernetes service, Kubernetes engine, or container engine for Kubernetes). A container, as referred to herein, packages up code and all its dependencies so an application (also referred to as a task, pod, or cluster in various container services) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). While multiple virtual machines can run on one physical machine, each virtual machine typically has its own copy of an operating system, as well as the applications and their related files, libraries, and dependencies. Some containers can be run on instances that are running a container agent, and some containers can be run on bare-metal servers, or on an offload card of a server.

A database service 128 may implement and manage a database on behalf of users, making it for users to set up, operate, and scale a database in the cloud. The database service 128 may provide resizable capacity while automating time-consuming administration tasks such as hardware provisioning, database setup, patching, backups, and the like. The database service 128 may manage database instances that are isolated database environments running in the provider network 100 that may contain one or multiple user-created databases that can be accessed using the same client tools and applications that are used to access stand-alone database instances. A database instance may have a database instance identifier, which can be a user-supplied name that uniquely identifies (e.g., within the entire provider network 100, or within a portion or region of the provider network 100) the database instance during interactions between the user and the database service 128 interfaces. A database instance may support a database engine. For example, the database service 128 may support a number of database engines, including but not limited to MySQL, MariaDB, PostgreSQL, Oracle, Microsoft SQL Server, Amazon Aurora, etc. In some embodiments, the database service 128 may support one or more NoSQL databases, one or more object database management systems, one or more object-relational database systems, one or more data warehouse systems, a "serverless" interactive query service, or the like. Interactions with the database instance(s) may be performed via use of database statements (e.g., queries, commands, or the like) that may adhere to a defined query language (as defined by a query language definition), such as one or more of the many dialects, extensions, and implementations of SQL, like Transact-SQL (T-SQL), Procedural Language/SQL (PUSQL), PUpgSQL (Procedural Language/PostgreSQL), SQL-86, SQL-92, SQL:2016, etc. The database instance(s) may thus implement a variety of types of databases in a variety of types of configurations.

A ML service 130 can allow users to prepare, build, train, and/or deploy high-quality ML models quickly by bringing together a broad set of capabilities purpose-built for ML. The ML service 130 can provide purpose-built tooling for different phases of ML development, including labeling, data preparation, feature engineering, statistical bias detection, auto-ML, training, tuning, hosting, explainability, monitoring, workflows, etc. A ML service 130 may also provide an integrated development environment (IDE) for ML to allow users to interactively and iteratively develop custom ML algorithms or applications. Moreover, in some embodiments a ML service 130 may make use of ML models to provide more high-level services to its users, such as by providing a speech transcription service, object detection or recognition service, text-to-speech service, document analysis service, or the like.

Commonly, attackers may seek to interact with resources implemented within a cloud provider network from a client 104A within the cloud provider network 100 (such as via a compromised virtual machine) or a client 104B outside the provider network (such as a personal computer of an attacker, a compromised device, etc.). Thus, malicious clients 104 may send API requests 105 to learn about, control, modify, obtain, etc., resources implemented within the provider network 100.

In some cases, a malicious client 104 may use an active set of security credentials (which may have been "stolen" or accessed from a compromised legitimate client) to generate one or more API requests 105 sent to one or more services 124 or other components of the provider network 100. However, in some cases a malicious client 104 need not use legitimate credentials at all, as some API calls may be allowed without credentials as they may be "open" for general callers. In some embodiments, an identity and access management service 102 may authenticate and authorize the requests based on the security credentials used to generate the requests. In some embodiments, information about the API requests 105 is stored in event logs 120 of an account activity logging service 108. For example, the logging and monitoring of API calls is often needed for security best practices and may be requirements for industry and regulatory compliance in some cases. In some embodiments, an account activity logging service 108 is a web service that records API calls to services of the provider network 100 as event logs 302 accessible to associated user account(s). In other embodiments, log information about API requests 105 is generated and stored by the identity and access management service 102, by another service of the provider network 100, or by any other component internal or external to the provider network 100.

In some embodiments, a threat detection service 112 may be configured to continuously or periodically monitor event logs 120 or other data (e.g., network flow logs, etc.) for malicious activity, which may use machine learning techniques based on one or more detection models to monitor for anomalous behavior. In some embodiments, any of such entities may generate anomaly alerts that identify the presence of a potential threat or anomalous behavior.

As indicated above, security credentials may be exposed to an unauthorized third party and used by a malicious client 104. As indicated above, once security credentials are in the hands of an unauthorized third party, the third party can perform any action in the associated user account permitted by the policies associated with those credentials (e.g., possibly including launching new compute instances, storing objects, deleting instances or stored objects, etc.). For example, a set of access keys may be accidentally committed to a public software development version control service, stolen from a compromised developer machine, intercepted when sent over an insecure network connection, or disclosed by other means. However, a legitimate user may become malicious and use legitimate credentials in an improper manner, such as in the case of an angry employee of an organization seeking to damage the company's resources, an employee attempting to use company resources for personal use, improperly gather company information or data, etc., any of which may be deemed an attack.

Such malicious activity may occur using a variety of types of techniques. Many types of techniques are categorized using the MITRE ATT&CK® system, which is a globally accessible knowledge base of adversary tactics and techniques based on real-world observations. The ATT&CK knowledge base is used as a foundation for the development of specific threat models and methodologies in the private sector, in government, and in the cybersecurity product and service community. Under this framework, attack "tactics" represent the "why" of an attack technique or sub-technique, and represent the adversary's tactical goal, i.e., the reason for performing an action. For example, an adversary may want to achieve credential access.

Techniques, on the other hand, represent "how" an adversary achieves a tactical goal by performing an action. For example, an adversary may dump credentials to achieve credential access. Sub-techniques are a more specific description of the adversarial behavior used to achieve a goal. They describe behavior at a lower level than a technique. For example, an adversary may dump credentials by accessing the Local Security Authority (LSA) Secrets.

Some tactics from this framework that may be applicable to cloud provider network managed resources are as follows:

Reconnaissance—the adversary is trying to gather information they can use to plan future operations.

Resource Development—the adversary is trying to establish resources they can use to support operations.

Initial Access—the adversary is trying to get into someone else's network.

Execution—the adversary is trying to run malicious code.

Persistence—the adversary is trying to maintain their foothold.

Privilege Escalation—the adversary is trying to gain higher-level permissions.

Defense Evasion—the adversary is trying to avoid being detected.

Credential Access—the adversary is trying to steal account names and passwords.

Discovery—the adversary is trying to understand and learn about an environment.

Lateral Movement—the adversary is trying to move through an environment.

Collection—the adversary is trying to gather data of interest to their goal.

Command and Control—the adversary is trying to communicate with compromised systems to control them.

Exfiltration—the adversary is trying to steal data.

Impact—the adversary is trying to manipulate, interrupt, or destroy your systems and data.

Cloud security services, such as the threat detection service 112, can be used to identify some potential security issues (such as the use of a tactic disclosed above), or "findings." These services can be helpful in alerting a user as to when something is wrong. However, in some cases, there might be a security finding where the user needs to dig a lot deeper and analyze more information to isolate a root cause and take action. Determining the root cause of a security finding can be a complex process that often involves collecting and combining logs from many separate data sources, using extract, transform, and load (ETL) tools or custom scripting to organize the data, and then involving security analysts to have them analyze the data and conduct lengthy investigations as to whether a true issue exists, how to potentially address a found issue, and determine which potential fixes can practically be done without breaking existing resources of the organization.

Current cloud cyber-security analysis tools bring information to security analysts at a very high level and/or at a very granular level. For example, some systems allow users to view diagrams of account activity, such as a list of API invocations, observed network traffic grouped by source network addresses (e.g., IP addresses) or the involved principal (e.g., user account), etc. Other systems raise alerts for specific events that may indicate suspicious activity, e.g., in the form of alerts ("findings") issued when activity associated with an account deviates from expected patterns seen in the past, or when it corresponds to known malicious attributes, such as using a penetration testing operating system to interact with a provider network.

However, in order to understand if particular activity is or is not malicious, users such as security analysts must have background knowledge about threats and attack patterns, what an attacker may want to achieve, and how it could be implemented. These users do so by evaluating granular information and building it up towards conclusions, which is a time consuming and error prone process, and requires an extremely large amount of technical knowledge and complete knowledge of the organization's resources. Further, the amount of time required to make these determinations may be extremely large, thus potentially allowing malicious behavior to continue (and possibly result in real damage) after aspects of the malicious behavior have been identified.

However, one of the fundamental use cases for using a security-type service is to quickly and easily investigate unusual resource activity and security findings. However, although existing services may provide some investigation guidance, the guidance is often generic and may not be easy to follow or apply to a particular situation. One particular challenge is that when an analyst is investigating a suspicious event/finding and they need to manually determine which API calls are anomalous and contributed (or could contribute) to a security finding. For example, even when an API method name that triggers a finding is known to the analyst, the analyst still needs to perform a manual inspection of records to determine which specific API invocation or invocations are of interest based on other indicators of concern (IOC), such as a user calling from a malicious IP address (returned in the finding), or some unknown location. For example, a user may be presented a list of API calls that occurred recently, but it is difficult or impossible to determine which of these calls are anomalous or related to a security finding, and how to identify which other calls occurred before or after, or which map to attack tactics. Often times, an analyst may simply start examining APIs calls with a high successful call count, however, API calls having a highest count may not be associated with an actual finding, thus wasting significant time and effort in the investigation.

In some embodiments, the security investigation service 110 can simplify this process by enabling users (e.g., an organization's security team) to easily investigate and quickly get to the root cause of a finding. The security investigation service 110 can analyze trillions of events from multiple data sources such as cloud virtual network flow logs, event logs 120, and threat detection service 112 findings, etc., and automatically create a unified, interactive view of an organization's resources, users, and the interactions between them over time. With this unified view, users can visualize all the details and context in one place to identify the underlying reasons for findings, drill down into relevant historical activities, and quickly determine the root cause.

The security investigation service 110, in some embodiments, aid security analysts by intelligently performing security investigations through the use of investigative playbooks. Investigative playbooks can improve the time to decide if detected activity is in fact malicious by bringing and contextualizing data to the user instead of requiring them to search for it manually. In some embodiments, the security investigation service 110 provides an interactive interface to users (such as via a web-based console) that allows security analysts (users) to investigate security incidents. The threat and attack patterns may be presented graphically to the user as diagrams annotated with data. The interface may filter down logs from multiple sources to show what is relevant to the user for further conducting the investigation. Users, in some embodiments, may use the interface to request additional information, for example details such as locations and IP addresses used by a particular network principal (e.g., user account).

In some embodiments, the security investigation service 110 contextualizes IOCs, which are actions that an adversary might be expected to take in preparation for an attack, e.g., using a graph database that aggregates multiple log sources. As opposed to only looking at events from a single source or entity in isolation, using a graph enable analysts to view event history, concurrent events, and all other actions taken by a principal in order to answer the playbook questions.

The security investigation service 110, in some embodiments, encodes investigation playbooks based on domain knowledge using threat modeling techniques. Investigation playbooks start from IOCs, such as invocations of known sensitive APIs or alerts raised by other monitors, and then may ask questions to determine if an alert is an attack or not. In some embodiments, the security investigation service 110 may answer the questions (in the form of executing multiple tests of a security analysis) or may prompt users, e.g., a security analyst, with a series of questions.

The security investigation service 110 may show, to the user via the graphical user interface of the console, a step-by-step guide on which questions to ask and data to evaluate in order to decide if an IOC is benign (i.e., a false alert) or indicative of an attack.

Accordingly, in some embodiments the security investigation service 110 may utilize an investigation playbook feature to enable users without deep security expertise to conduct partially or completely automated (e.g., "one-click") investigations of provider network resource activities to a summary narrative of observed security relevant API activity and may provide explanations of potential security threats and supporting artifacts. The security investigation service 110 may thus assist with the automation of security investigation, allow the user to focus on high-quality events of interest, and provide a clear summary report.

In some embodiments, the security investigation service 110 may evaluate how unusual an activity is through use of machine learning models. The models may score both individual events (e.g., API calls) and sequences of events. For example, a common step in attacks is to grant permissions in order to achieve a goal such as invoking an API. Granting permissions is also a common step for benign activity when creating new users and setting up new processes. Embodiments can distinguish between attacks and benign activity based on what the caller/user does after granting permissions, and if those permissions enable unusual actions. By evaluating sequences of actions instead of single actions, embodiments can identify if activity overall is malicious when compared to known attack patterns and with previous activity.

Figure 2:
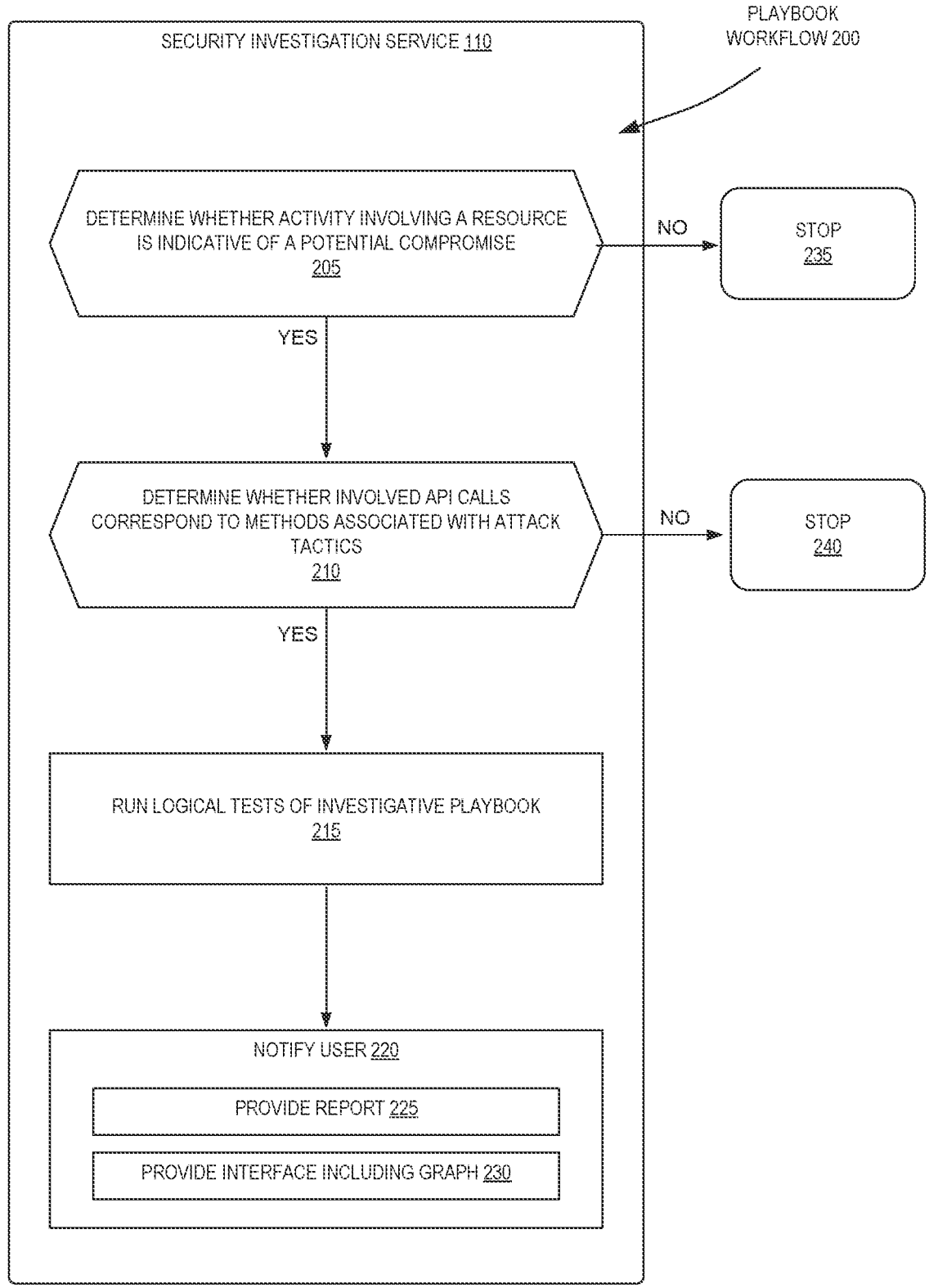
FIG. 2 is a diagram illustrating a high-level exemplary three-phase flow of operations for generating investigative playbooks for cloud security events according to some embodiments.

For example, FIG. 2 is a diagram illustrating a high-level exemplary three-phase flow of operations, or playbook workflow 200, for generating investigative playbooks for cloud security events according to some embodiments. The playbook may be a feature provided by a console that includes a set of logical investigation questions based on observed IOC and security findings that takes into account attack vectors and threat modeling to formalize the checks. In some embodiments, to run entirely through a playbook, two IOC types are to be observed (as reflected by phases one and two).

The workflow includes three main phases: phase one for determining if the resource has unusual activities (or, activity indicative of a compromise), and phase two for determining if the user called APIs having methods that map to a formal model of attack tactics (e.g., crafted based on MITRE tactics or other tactics). If both exist, then the playbook checks are performed in phase 3. Throughout all phases, the security investigation service 110 may collect artifacts and annotate them as appropriate in the summary report.

The first phase of the workflow 200 is determining whether activity involving a resource is indicative of a potential compromise at block 205. A provider network resource may be of a variety of types of resource, such as a provider network user account, a particular compute instance, a storage service storage location (e.g., a folder or bucket), a particular stored object, a database, a network address, a "role" of a user account, etc. Block 205 may focus upon the "caller" or client making API calls involving a resource, and may include the detection of an API call (or set thereof) being made that has not been made before (for a particular user, or across an organization) or within a recent period of time, was from a new geolocation, network address, or network. Block 205 may additionally or alternatively involve activity or configurations associated with or determined within the provider network, such as determining whether a security-related finding was originated by another service of the provider network, detecting an improper or misconfigured resource within the provider network (e.g., a non-protected storage location), etc., as described in further detail later herein. If no unusual activity is found, the process may halt at block 235.

The second phase of the workflow 200 includes determining whether the client made use of APIs calls having API methods that map to a formal model of attack tactics, e.g., based on MITRE tactics or other attack models, which are part of a standard framework for describing Tactics, Techniques and Procedures (TTPs) that could be used by an attacker. If no such mapping can be found, the process may halt at block 240. In some embodiments, a formal, systematic description of steps attackers take to perform various attack tactics is utilized, which may or may not be based on the known MITRE tactics. For example, the formal model may indicate that a first API method of "Get Folder Access Control List"—which is valid for use within the provider network to determine what access control list settings are configured for a particular storage location (e.g., folder, bucket, or the like)—may be associated with a tactic of "discovery," whereas a second API method of "DeleteObject"—which also is valid for use in the provider network to delete an object stored in a particular storage location—may be associated with a separate tactic of "Impact" (e.g., pertaining to data destruction). These mappings may be encoded within a formal model of attack tactics applicable to the provider network.

However, if both blocks 205 and 210 (corresponding to phases one and two) are satisfied, the security playback analysis to identify specifics about the threat that can be reported to the user via notifying the user at block 220, which may include providing the investigation report 225 (including artifacts collected during one or more—or possibly all—phases) and/or providing an interface to the user including a graph (at block 230) for further investigation.

For further detail, FIG. 3 is a diagram illustrating exemplary lower-level operations for generating investigative playbooks for cloud security events according to some embodiments.

The operations of block 205—for determining whether a resource has activities indicative of a potential compromise—may include one or more of determining whether a new user-agent is seen in recent traffic involving the resource (block 305), determining whether a new geolocation is seen in recent traffic involving the resource (block 310) for example based on identifying a geolocation associated with a source IP address used in traffic, determining whether a new source network location is seen in recent traffic involving the resource (block 315) for example based on seeing a source IP address used in traffic is from a new autonomous system (AS), determining whether a "suspicious activity" (or "anomalous activity") finding involving the resource was generated by another security service (at block 320) within a recent period of time, detecting a resource misconfiguration (e.g., a storage location being left available for public access, an invalid or anomalous set of permissions being set for a user or role, a cloud virtual network being made available for public internet connectivity), etc.

The recent period of time—or time window—may be set by the service, or by the associated user, and could be a number of minutes, hours, days, or the like—e.g., sixty minutes. As is known to those of skill in the art, a user-agent value may be passed with HTTP request messages to identify aspects of the caller. For example, when a software agent operates in a network protocol, it often identifies itself, its application type, operating system, software vendor, or software revision, by submitting a characteristic identification string to its operating peer. In the HTTP protocol, this identification is transmitted in a header field called User-Agent. Bots, such as Web crawlers, often also include a URL and/or e-mail address so that the Webmaster can contact the operator of the bot.

In some embodiments, this phase may include generating a message in the attack report, e.g., "The data in this summary is based on activity observed during this time range: X", where X is a time window.

The objective for this phase may be to determine whether a resource has unusual activities, or a first IOC ("IOC1"). If the resource doesn't have any then the playbook will not be run. If the resource does have unusual activities, however, then the playbook will later check if the client called security related APIs that map to attack tactics in phase two, as a second IOC ("IOC2").

In this phase, the following artifacts may be collected (when relevant) and later made available with the attack report: a list of new geolocations (e.g., "Paris, France"), a list of new observed source IP addresses (e.g., "1.2.3.4"), a list of newly-observed user-agents, a list of new AS identifiers, a list of finding identifiers (of findings generated by other services), an indicator of the time window, etc.

These values may be annotated in the summary attack report. For example, if a new geolocation is observed, the report may have the following entry:

resourceType+resourceName+"operated from unusual locations:"+newGeoLocation+". The resource used previously unobserved IP addresses."+newIPs (e.g., "User john_doe operated from unusual location: Paris, France. The resource used previously unobserved IP address: 1.2.3.4")

As another example, if a new user agent is observed, the report may have the following entry:

resourceType+resourceName+"used an unusual user agent:"+newUserAgent resourceType+resourceName+"used an unusual AS:"+newAS resourceType+resourceName+"was the subject of"+num_findings)+"security findings during the last"+time_window+"days."

This portion of the report may be updated to include links that allow the user to explore further information, e.g., by providing a link to view the findings, a link to view details about a UserAgent that was not seen before, a link to view a malicious IP address profile, etc.

The operations of block 210—for determining whether the involved API calls are calls corresponding to attack tactics—may include obtaining a list of observed (successful) API calls made over the window of time (such as from a service providing/hosting the resource, from an IAM type service, from a "control plane" service of the provider network, etc.) and determining whether any of the API calls are included in a tracked set of API calls (at block 335) included in a formal model of attack tactics.

Block 210 thus includes determining whether specific API method(s) successfully invoked by the client (e.g., a "UpdateUserPolicy" call) map to one or more attack tactics.

Although some failed API calls could map to attack phases, such as "describe" type calls in a recon phase, they are of less concern as successful attacks are carried out by successful API invocations and not failed ones. For that reason, in some embodiments the playbook focuses on successful calls.

For example, block 210 may include collecting the following artifacts: a set of API call methods that were sent during the period of time, and a set of tracked "security" API calls that are applicable/valid within the provider network that map to attack tactics (e.g., MITRE tactics or other attack tactics) of a formal model. This set may be created based on analyzing which particular API methods are implemented in a provider network, and determining which, if any, attack tactics the call could be used as part of. Each tracked call may have an entry in a data structure, such as an identifier of the API method, a severity (e.g., low, medium, high), an identifier of the associated attack tactic, an identifier of one or more finding types that can be triggered by the API, etc.

For example, some embodiments utilize a hashtable of all API methods known to be ones useful as part of attack tactics, and the list of all newly observed API calls can be obtained and filtered to remove values that are not within the hashtable of attack-tactic mapped APIs.

If at least one API was called utilizing such a method, then an entry may be added to the report summary, e.g.:
"resourceType+resourceName+"called security-related APIs from a new geoLocation."+newGeoLocation+"is known to be associated with attack tactics."

When no such API calls are found that map to an attack tactic, the process may halt without even running the playbook, and the report summary may be modified to include a phase such as ""No security-related APIs were invoked by"+"resourceType+resourceName+during the scope time."

When the above conditions are met (e.g., blocks 205 and 210), the playbook will run (e.g., via block 215) through a set of logical checks to collect data used as artifacts in the report, or that feeds into another conditional check to generate a final report and graphs.

For example, block 350 may include a check as to whether any of the called API methods (from phase 2) are anomalous in some manner. For example, block 350 may include determining whether they are associated with an anomaly finding on the part of another security service, whether this is the first time they've been seen from that user or the user's associated group (e.g., an entire organization, department, team, or the like), whether a machine learning model predicts that they are anomalous (e.g., a model trained based on activity patterns associated with various users or services), etc. Identifying anomalous API calls can be important as it increases the probability of the event being malicious and helps an analyst narrow their investigation.

In some embodiments, this check may include using a lookup table for APIs that corresponds to findings reported on the resource, e.g., by the threat detection service 112. If an API call is anomalous, the API method name may be annotated in a graph (as disclosed elsewhere herein) for visibility, and/or an entry may be added to the attack report:
"These utilized API methods are known to trigger security findings:"+APIswithFindings+"Examine these API calls first."

Next, a block 355 may include a check as to whether any of the API calls invoked are or are not commonly called by the same caller (e.g., user account) within a recent period of time from other locations. For example, in some embodiments, if a new geolocation is detected, then the check includes determining if the APIs invoked from this new geolocation are not new in the system for that principal (i.e., check if the resource—the user account—commonly calls these APIs within a recent window of time). Thus, this check can assess if calls using these API methods are common for that resource (e.g., user account) from other locations. If the user commonly calls these APIs in the past, then this may indicate that the user is travelling, and it is not an abnormal activity even if the geolocation is new.

If the answer is yes—that the user has called the same APIs recently from other more "normal" locations—an entry may be inserted in the report summary according to the following format:
"resourceType+resourceName+"called these API methods in the past from other locations"+count+"times between:"+firstObservedTime+"and"+lastObservedTime. Calling these API methods is a common activity for this resource."

If answer is no, and entry may be inserted according to the following format:
"resourceType+resourceName+"did not call these API methods in the past from other locations. Calling these API methods is an uncommon activity for this resource."

Next, a block 360 may include a check as to whether calling from a new location is common for the entire account for any principal over a period of time (e.g., forty-five days). Notably, if calling from this location is common for the entire account(s), then it is likely that these calls are normal (unless the actual IP address involved is malicious).

Thus, if the answer is yes, an entry in the attack report may be as follows:
"Calling from the location"+newGeoLocation+"is common for the entire account. These API calls are normal."

If answer is no:
"Calling from the location"+newGeoLocation+"is uncommon for the entire account. This activity is unusual."

Next, a block 365 may include a check as to whether of the API calls made from the new location used a malicious IP address. This can be useful as the knowledge of a call to a APIs from a malicious source IP address could indicate that the user credentials were compromised.

If so, an entry may be made in the report summary as follows:
"This resource used the following IP addresses that are known to be malicious:"+maliciousIPs Next, a block 365 may include a check as to whether a malicious IP address was used by other resources (e.g., user accounts). To perform this check, a list identifying a set of other resources (e.g., user accounts) that made calls (e.g., any API call, not just the same calls or API method calls mapped to a tactic) may be obtained as a value 'principalscalledbadIP'. If other principals exist, the attack report may be annotated as follows:
"These other principals in the account made calls from this IP address:"+principalscalledbadIP The user interface may be adapted to include a "hover" user interface element (e.g., a small box) to be shown when the user hovers over each principal to present more information (e.g., profile information) about the principal, and/or the particular IP address may be linked to lead to a new page to view more profile information about that address.

In some embodiments, the security playbook may include other logical tests (or analysis) and associated actions for gathering intelligence for inclusion in the report. As one example, a determination can be made to determine which all services (of the provider network) and/or resources of the provider network that the caller (e.g., a same user account) has accessed over a recent period of time, and then describe/list them within the report. This can provide a user (e.g., a security analyst) with a view of a "blast radius" of the involved user showing what particular services or resources that user has "touched," thus enabling further investigations, allowing for insight into the purpose of the attack, encouraging further remediation actions, etc. Additionally, or alternatively, the playbook may include a check to determine what all possible services and/or resources the involved caller is allowed access to, regardless of whether they have (or have not) actually access them, providing a potential blast radius for subsequent or ongoing attacks.

After the playbook runs, using this information the summary investigation report can be presented to a user with various graphical elements (e.g., a visual representation of a graph), text, etc., as is shown later herein, to allow the user to view concise, helpful, relevant information about what has happened, optionally drill down into specifics, and use provided suggestions as to what items need to be investigated next, if any.

Further, in some embodiments, if approved by the organization (or an agent thereof) custom logic may be implemented to auto-correct (fix) particular security issues that were identified herein. For example, a variety of remediations could be put in place at this point, such as blocking traffic from the involved user account/IP address, increasing a logging amount or security analysis level associated with the user account/IP address, immediately notifying a different user account associated with the involved user (e.g., a security analyst at the same company as the involved user) via a separate channel of communication (e.g., text message, phone call, email, etc.), notifying the involved user associated with a possibly compromised user account, etc. The actions may also be based on the type of attack that is detected, e.g., an attack seeking to obtain data may be blocked by changing the permissions of a storage location, a particular API method call may be disabled for a particular user account, traffic of the user could be shifted into a honeypot type system for further analysis, or the like.

As indicated herein, the security investigation service 110 may be utilized by a user via use of an application such as a web-based console, standalone application, etc., which may provide a graphical user interface (GUI) to the user for ease of access. Many different interfaces may be used in various embodiments; a few are shown in the following figures.

Figure 4:
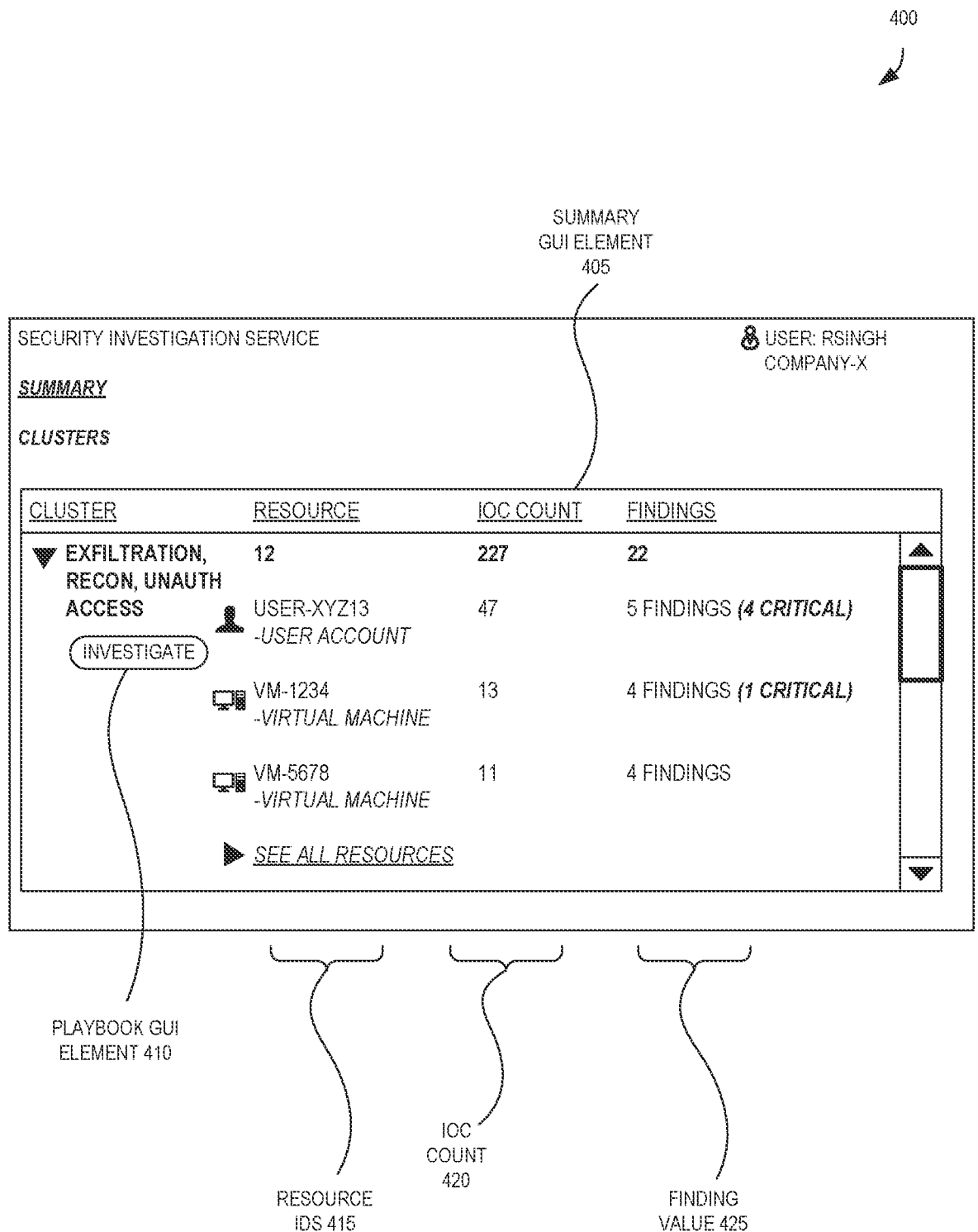
FIG. 4 is a diagram illustrating an exemplary graphical user interface (GUI) for presenting results from investigative playbooks for cloud security events according to some embodiments.

FIG. 4 is a diagram illustrating an exemplary GUI 400 for presenting results from generated investigative playbooks for cloud security events according to some embodiments. This GUI 400 may be presented to a user (e.g., a security analyst) associated with a number of resources (e.g., of an organization) within the provider network 100, such as a number of user accounts, roles, cloud virtual networks, access control lists/rules, virtual machines, databases, object storage locations and objects stored therein, images, containers, etc. This exemplary interface 400 provides a summary GUI element 405 (here, a table having one or more rows) providing the user with information about "clusters" of resources, associated with that user (e.g., associated with that user's organization), that may collectively be part of a same attack and that should be investigated for security-related issues.

In this example, the summary GUI element 405 has a row for each such cluster. In this example, one top-level row is shown for a cluster of resources pertaining to an "exfiltration, reconnaissance, and/or unauthorized access" tactic. This top-level row has summary statistics across multiple columns, here showing a number of resources involved (12), an IOC count (227), and a number of associated findings (22). This top-level row is also shown as having a playbook GUI element 410 (e.g., a button) that can be selected by a user to view more information regarding the security issues with that resource—e.g., view the attack report generated based on the investigation playbook, associated graphs, raw analysis data, attack-associated data, etc.

Each cluster may have one or more associated per-resource rows providing details about each resource involved in that cluster, where each row may also include a resource identifier 415 value identifying the resource. In this illustrated example, a first resource is a user account identifier, the second and third rows are virtual machine identifiers, while others could be identifiers of other resources, where each identifier is unique (e.g., for that user, for the organization, or for all similar resources within the provider network). Each resource row may also include an IOC count 420 value providing some representation of how many IOCs have been found for the resource (e.g., here a number of IOCs, though alternatively a graphical indication such as differently colored icons to show severity, etc.) and/or a finding value 425 indicating a number of specific findings found for that resource (e.g., from a separate security service), and here showing how many of those have a "critical" severity level associated therewith.

Upon selecting a playbook GUI element 410 for a cluster, the user may be presented a different interface (e.g., by the security investigation service 110, such as by sending an HTML page to the user's device) to view investigative playbook type information.

Figure 5:
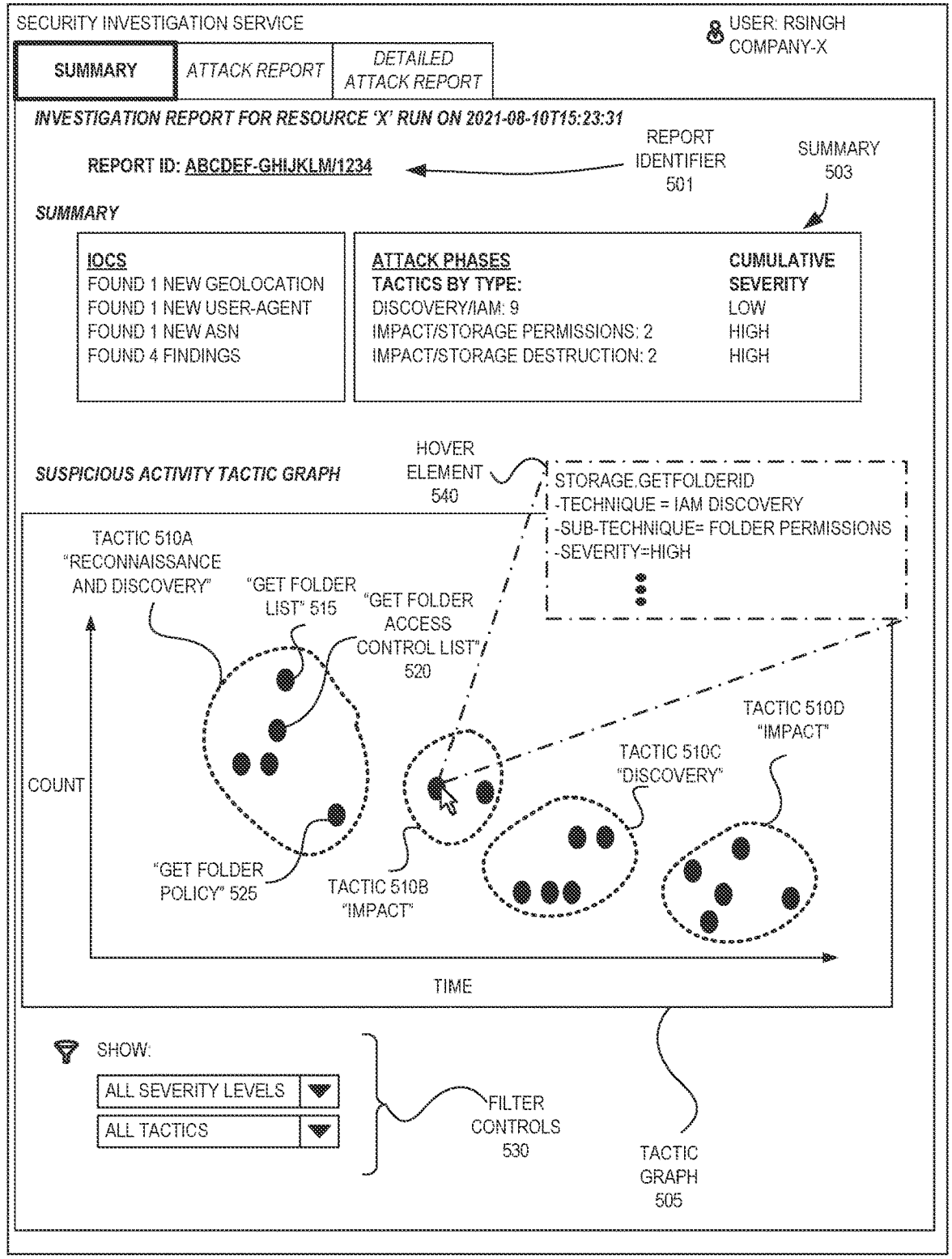
FIG. 5 is a diagram illustrating an exemplary GUI presenting a tactic graph generated during the execution of an investigative playbook for cloud security events according to some embodiments.

For example, the user may view an investigatory playbook attack report summary such as one shown in FIG. 5, which is a diagram illustrating an exemplary GUI 500 presenting a tactic graph 505 generated during the execution of an investigative playbook for cloud security events according to some embodiments.

The tactic graph 505 may present a view, over time (as the x-axis), of "clusters" of different tactics (e.g., tactics 510A-510D) observed with counts of individually observed API method calls (as the y-axis) made that were part of the detected tactics. In this example, four different tactics 510A-510D are illustrated, where the top-left tactic 510A of "reconnaissance and discovery" is shown with several illustrated API method calls—"get folder list" 515, "get folder access control list" 520, "get folder policy" 525, and the like, which in this example were successfully invoked to retrieve information associated with a specific object storage location (here, a "folder") provided by a storage service of the provider network. In some embodiments, the user may hover over or select a tactic 510 and/or API method calls (e.g., 515/520/525) to view more information about the tactic (e.g., a definition) or the individual calls (e.g., the actual request contents, a definition of what the method is for, the actual response to the request, etc.). In this example, a user has hovered or clicked on an API method dot within the "impact" tactic 510B cluster, resulting in a hover element 540 showing information about the API calls of that method belonging to the cluster—here, the API method name, the technique and/or sub-technique of the associated attack tactic, a severity, or the like.

In some embodiments, the 500 GUI may include a set of filter controls 530 allowing the user to view more or fewer aspects of the graph. In this example, a user may control which severity levels of information are shown (e.g., "only high" or "all" or the like), which tactics are shown, etc.

This GUI 500 also includes a summary 503 showing the set of attack tactics that were detected, by showing a tactic name, a tactic count, a cumulative severity of the API calls, etc. The GUI 500 may also include an element (here, a selectable "link" showing the report identifier 501) allowing the user to view a more detailed report.

Figure 6:
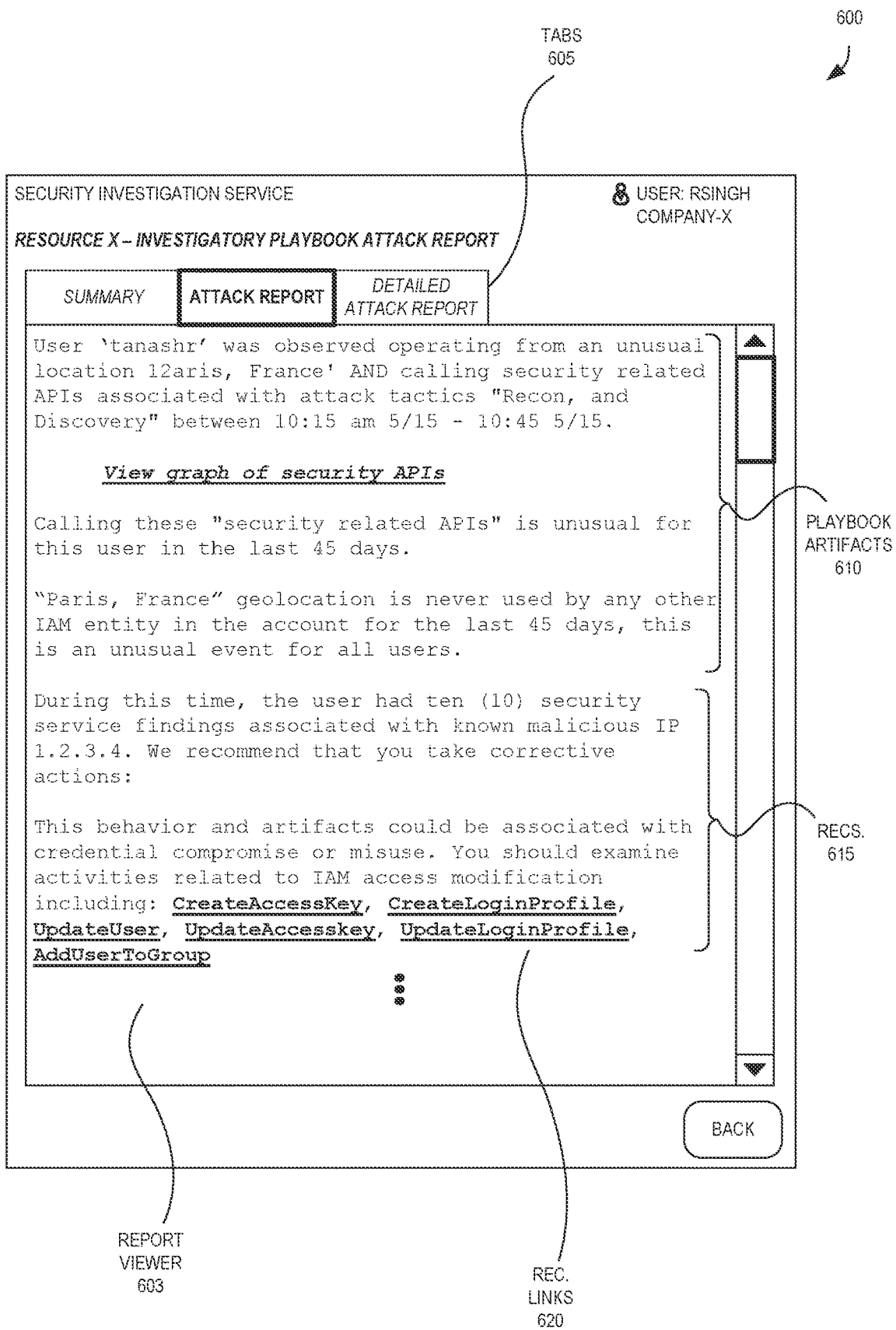
FIG. 6 is a diagram illustrating an exemplary GUI presenting a partial attack report generated by an investigative playbook for cloud security events according to some embodiments.

For example, upon selecting this element, the user may view an investigatory playbook attack report such as one shown in FIG. 6, which is a diagram illustrating an exemplary GUI 600 presenting a partial attack report generated by an investigative playbook for cloud security events according to some embodiments. As shown, the GUI 600 may include a main GUI element (e.g., a window or frame) providing a report viewer 603 allowing the user to view the attack report, which may include playbook artifacts 610 generated as described above during the course of running the investigative playbook phases. The report viewer 603 may also show specific recommendations 615 describing how the user may wish to perform further investigations, as in some cases it may not be desired for the security investigation service 110 to automatically perform fixes/remediations due to the possibility of breaking a user's application or otherwise interfering with important organizational uses of the provider network. The recommendations 615 section of the attack report may also include recommended links 620 (here, as textual hyperlinks though other UI elements known to those of skill in the art may be used) to allow the user to quickly investigate specific aspects. The GUI 600 may also allow the user to view other types of data associated with the running of an investigative playbook, such as via tabs 605 allowing a user to view graphs (e.g., a tactic graph, activity graph, etc.), a more detailed attack report, etc.

In some embodiments, a user may also be presented a more low-level report associated with the attack report. For example, FIG. 7 is a diagram illustrating a GUI 700 with exemplary output from a first phase of the execution of an investigative playbook for cloud security events according to some embodiments. This output, referred to as a detailed report 705, may show lower-level information allowing the user to see results of the investigative playbook execution with more detail. In this example, an "intro" section shows the involved resource—here, a RoleSession. IAM roles help users grant access to provider network services and resources by using dynamically generated short-term credentials. Each instantiation of an IAM role, and the associated set of short-term credentials, is known as an IAM role session. Each IAM role session is uniquely identified by a role session name—here, an alphanumeric string of random numbers and letters combined with a name JohnDoe-Project. The time scope of the investigation is also shown.

The detailed report 705 also shows output/artifacts generated by a first phase, presenting a summary of this data (e.g., "Found 1 new GeoLocation") and here, allowing the user to select ones of these values to view more information—e.g., clicking or hovering over "1 new GeoLocation" may show the geolocation and/or a map, clicking on "3 findings" may allow the user to view findings generated by other security services, etc.

FIG. 8 is a diagram illustrating a GUI 800 showing exemplary output from a second phase of the execution of an investigative playbook for cloud security events according to some embodiments. In this example, each of the portions of phase 2 are shown, together with more specific information about the findings. For example, a first API method call of "PutFolderPublicAccessBlock" made to a storage service is found to map to a high-severity tactic of "Impact" (the adversary is trying to manipulate, interrupt, or destroy systems/data), and the technique and sub-technique is shown, together with the source IP address, a process ID (PID), tactic-related activity (e.g., call of the GetFolderAcl method, seeking an access control list for a folder). Other security-related API method calls are also shown in similar detail.

FIG. 9 is a diagram illustrating a GUI 900 showing exemplary output from a third phase of the execution of an investigative playbook for cloud security events according to some embodiments. In this portion of the detailed report, results from the running of the checks of the investigative playbook are shown, indicating both problematic aspects (e.g., an IP address being malicious, particular different types and proportions of attack tactics that were detected, counts and/or listings of API calls that map to tactics, etc.) together with non-problematic aspects (e.g., a newly used location for a user is actually common for the entire account/organization, a newly-observed autonomous system (AS) is actually common for the entire account/organization, etc.)

With this lower-level information—some of which being concerning, others of which being not concerning—the analyst may learn more about the potential issues and rule in or rule out aspects of the possible attack and/or options for remediation.

Figure 10:
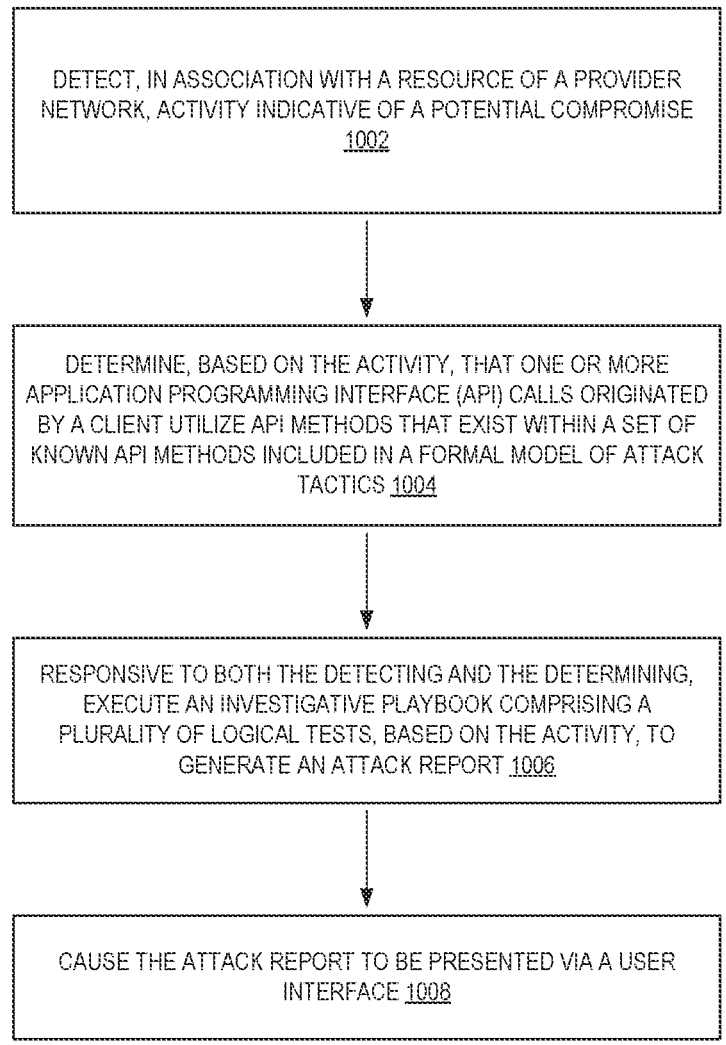
FIG. 10 is a flow diagram illustrating operations of a method for utilizing investigative playbooks for cloud security events according to some embodiments.

FIG. 10 is a flow diagram illustrating operations of a method for utilizing investigative playbooks for cloud security events according to some embodiments. Some or all of the operations 1000 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some embodiments, one or more (or all) of the operations 1000 are performed by the security investigation service 110 of the other figures.

The operations 1000 include, at block 1002, detecting, in association with a resource of a provider network, activity indicative of a potential compromise. The detection may occur based on analysis of network traffic (or logs thereof), such as the analysis of records of API calls sent by a client to a service providing or hosting the resource.

In some embodiments, block 1002 includes determining that the client is associated with a geolocation, network, or user agent that has not been observed in association with the resource over a recent period of time. The determining may include identifying a geolocation associated with a source IP address used to originate an API call (e.g., using a network address to geolocation mapping database or service), determining a network (e.g., an ASN) associated with a client used to originate an API call, identifying a user-agent value passed as part of the API call (e.g, within an HTTP request header), etc.

In some embodiments, block 1002 includes obtaining, from a service of the provider network, a security finding associated with the resource; or determining that a configuration associated with the resource is improper (e.g., by analyzing a set of configuration values for the resource, by receiving a notification from a service hosting the resource that a configuration has changed or is improper, etc.).

The operations 1000 further include, at block 1004, determining, based on the activity, that one or more Application Programming Interface (API) calls originated by a client utilize API methods included in a formal model of attack tactics. In some embodiments, a provider network may create a formal model of attack tactics, e.g., a set of API methods that are valid within the provider network that correspond to particular tactics used by attackers.

The operations 1000 further include, at block 1006, responsive to both the detecting and the determining, executing an investigative playbook comprising a plurality of logical tests, based on the activity, to generate an attack report.

In some embodiments, the plurality of logical tests of the investigative playbook comprise determining whether the one or more API call methods have been called, within a recent window of time, from other locations. In some embodiments, the plurality of logical tests of the investigative playbook further comprise determining whether a location associated with the caller was also associated with other callers of a same organizational account as that of the caller. In some embodiments, the plurality of logical tests of the investigative playbook further comprise determining whether a network address utilized by the caller is a known or predicted malicious address. In some embodiments, the plurality of logical tests of the investigative playbook further comprise determining whether other user accounts utilized the same network address as utilized by the caller.

The operations 1000 further include, at block 1008, causing the attack report to be presented via a user interface.

In some embodiments, the attack report identifies a specific attack tactic detected based on network traffic. In some embodiments, the attack report further identifies one or more suggested analysis or remediation actions.

The operations 1000 may further include causing the user interface to display a graph, generated based on the attack report, to be presented, where the graph illustrates one or more clusters, each cluster corresponding to a detected attack tactic and including representations of a set of API call methods, observed in network traffic, associated with the attack tactic.

In some embodiments, the operations 1000 further include determining a remediation action to be performed, within the provider network, to address a specific attack tactic detected based on the network traffic; and performing the remediation action.

Figure 11:
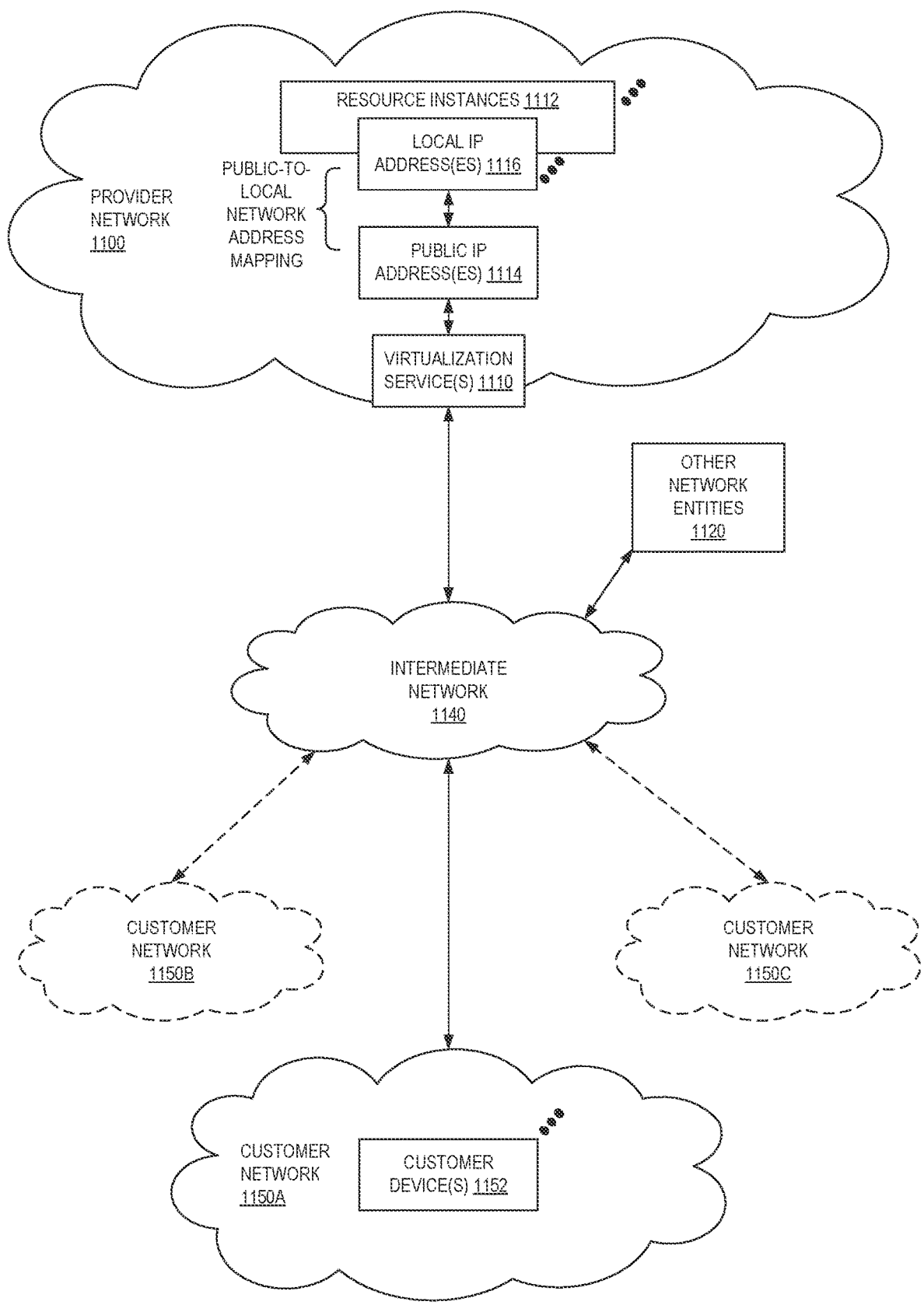
FIG. 11 illustrates an example provider network environment according to some embodiments.

FIG. 11 illustrates an example provider network (or "service provider system") environment according to some embodiments. A provider network 1100 can provide resource virtualization to customers via one or more virtualization services 1110 that allow customers to purchase, rent, or otherwise obtain instances 1112 of virtualized resources, including but not limited to computation and storage resources, implemented on devices within the provider network or networks in one or more data centers. Local Internet Protocol (IP) addresses 1116 can be associated with the resource instances 1112; the local IP addresses are the internal network addresses of the resource instances 1112 on the provider network 1100. In some embodiments, the provider network 1100 can also provide public IP addresses 1114 and/or public IP address ranges (e.g., Internet Protocol version 4 (IPv4) or Internet Protocol version 6 (IPv6) addresses) that customers can obtain from the provider 1100.

Conventionally, the provider network 1100, via the virtualization services 1110, can allow a customer of the service provider (e.g., a customer that operates one or more customer networks 1150A-1150C (or "client networks") including one or more customer device(s) 1152) to dynamically associate at least some public IP addresses 1114 assigned or allocated to the customer with particular resource instances 1112 assigned to the customer. The provider network 1100 can also allow the customer to remap a public IP address 1114, previously mapped to one virtualized computing resource instance 1112 allocated to the customer, to another virtualized computing resource instance 1112 that is also allocated to the customer. Using the virtualized computing resource instances 1112 and public IP addresses 1114 provided by the service provider, a customer of the service provider such as the operator of the customer network(s) 1150A-1150C can, for example, implement customer-specific applications and present the customer's applications on an intermediate network 1140, such as the Internet. Other network entities 1120 on the intermediate network 1140 can then generate traffic to a destination public IP address 1114 published by the customer network(s) 1150A-1150C; the traffic is routed to the service provider data center, and at the data center is routed, via a network substrate, to the local IP address 1116 of the virtualized computing resource instance 1112 currently mapped to the destination public IP address 1114. Similarly, response traffic from the virtualized computing resource instance 1112 can be routed via the network substrate back onto the intermediate network 1140 to the source entity 1120.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some embodiments, the mapping of a standard IP address to a local IP address of a resource instance is the default launch configuration for all resource instance types.

At least some public IP addresses can be allocated to or obtained by customers of the provider network 1100; a customer can then assign their allocated public IP addresses to particular resource instances allocated to the customer. These public IP addresses can be referred to as customer public IP addresses, or simply customer IP addresses. Instead of being assigned by the provider network 1100 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 12:
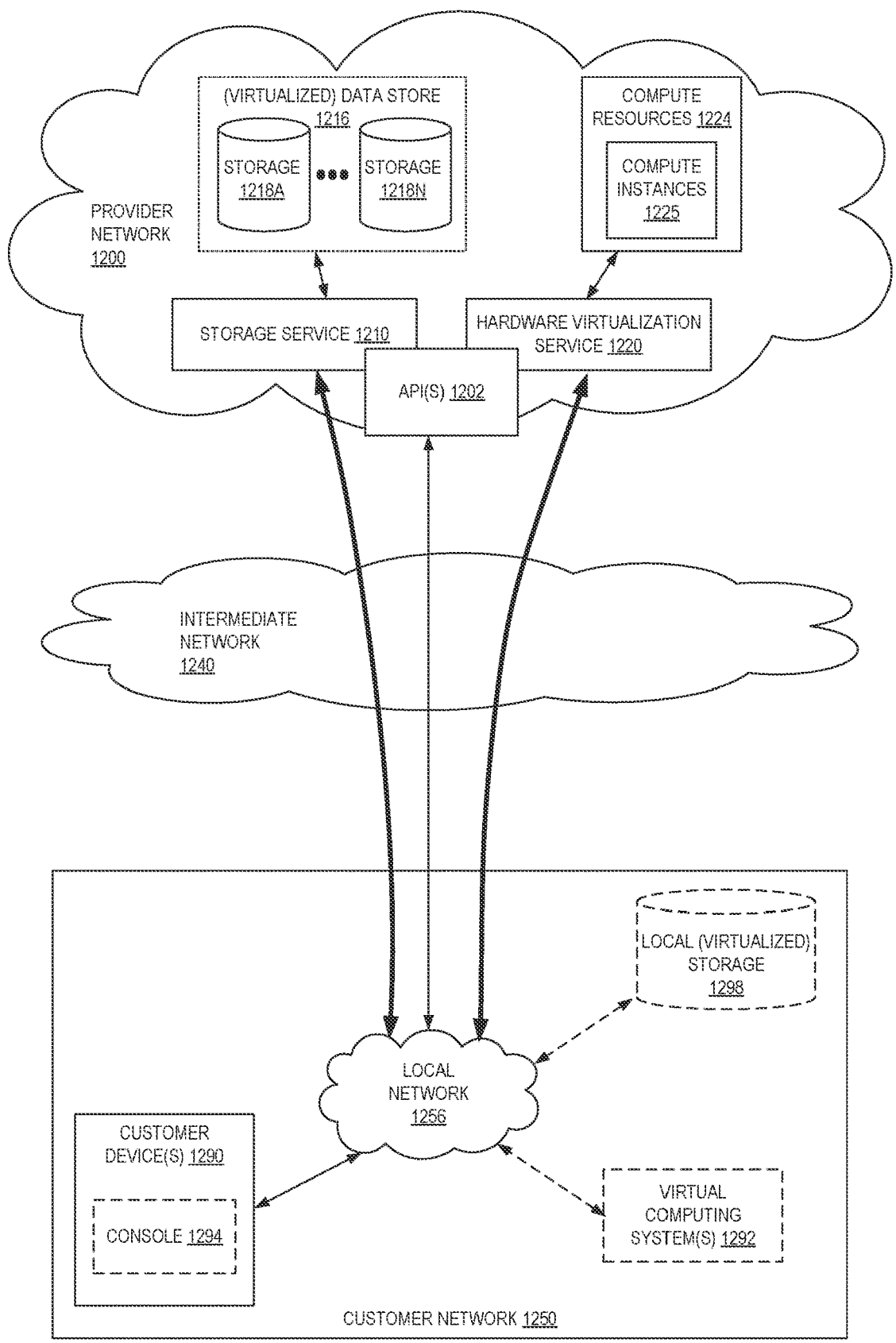
FIG. 12 is a block diagram of an example provider network that provides a storage service and a hardware virtualization service to customers according to some embodiments.

FIG. 12 is a block diagram of an example provider network environment that provides a storage service and a hardware virtualization service to customers, according to some embodiments. A hardware virtualization service 1220 provides multiple compute resources 1224 (e.g., compute instances 1225, such as VMs) to customers. The compute resources 1224 can, for example, be provided as a service to customers of a provider network 1200 (e.g., to a customer that implements a customer network 1250). Each computation resource 1224 can be provided with one or more local IP addresses. The provider network 1200 can be configured to route packets from the local IP addresses of the compute resources 1224 to public Internet destinations, and from public Internet sources to the local IP addresses of the compute resources 1224.

The provider network 1200 can provide the customer network 1250, for example coupled to an intermediate network 1240 via a local network 1256, the ability to implement virtual computing systems 1292 via the hardware virtualization service 1220 coupled to the intermediate network 1240 and to the provider network 1200. In some embodiments, the hardware virtualization service 1220 can provide one or more APIs 1202, for example a web services interface, via which the customer network 1250 can access functionality provided by the hardware virtualization service 1220, for example via a console 1294 (e.g., a web-based application, standalone application, mobile application, etc.) of a customer device 1290. In some embodiments, at the provider network 1200, each virtual computing system 1292 at the customer network 1250 can correspond to a computation resource 1224 that is leased, rented, or otherwise provided to the customer network 1250.

From an instance of the virtual computing system(s) 1292 and/or another customer device 1290 (e.g., via console 1294), the customer can access the functionality of a storage service 1210, for example via the one or more APIs 1202, to access data from and store data to storage resources 1218A-1218N of a virtual data store 1216 (e.g., a folder or "bucket," a virtualized volume, a database, etc.) provided by the provider network 1200. In some embodiments, a virtualized data store gateway (not shown) can be provided at the customer network 1250 that can locally cache at least some data, for example frequently accessed or critical data, and that can communicate with the storage service 1210 via one or more communications channels to upload new or modified data from a local cache so that the primary store of data (the virtualized data store 1216) is maintained. In some embodiments, a user, via the virtual computing system 1292 and/or another customer device 1290, can mount and access virtual data store 1216 volumes via the storage service 1210 acting as a storage virtualization service, and these volumes can appear to the user as local (virtualized) storage 1298. While not shown in FIG. 12, the virtualization service(s) can also be accessed from resource instances within the provider network 1200 via the API(s) 1202. For example, a customer, appliance service provider, or other entity can access a virtualization service from within a respective virtual network on the provider network 1200 via the API(s) 1202 to request allocation of one or more resource instances within the virtual network or within another virtual network.

Illustrative Systems

Figure 13:
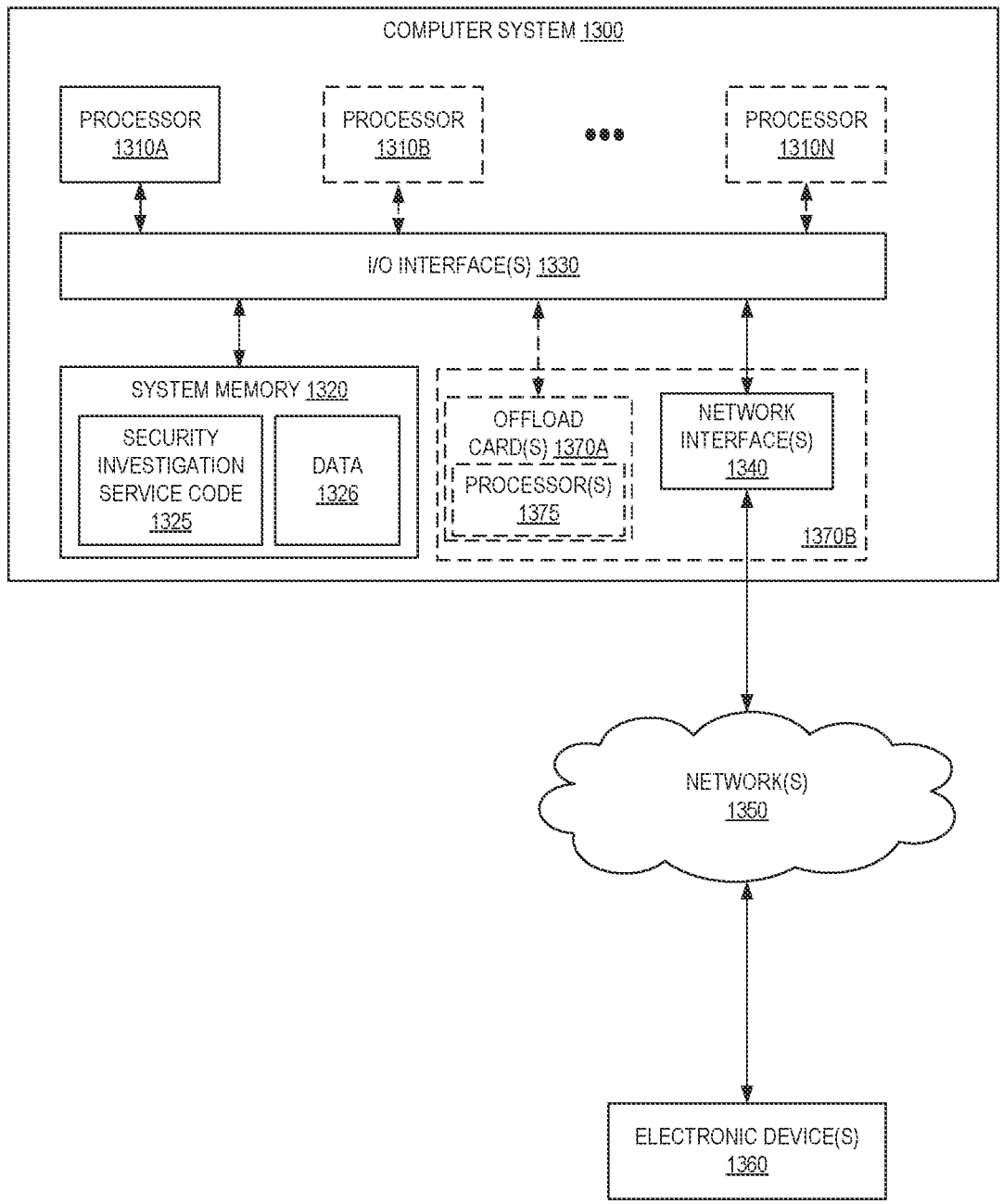
FIG. 13 is a block diagram illustrating an example computer system that can be used in some embodiments.

In some embodiments, a system that implements a portion or all of the techniques described herein can include a general-purpose computer system, such as the computer system 1300 illustrated in FIG. 13, that includes, or is configured to access, one or more computer-accessible media. In the illustrated embodiment, the computer system 1300 includes one or more processors 1310 coupled to a system memory 1320 via an input/output (I/O) interface 1330. The computer system 1300 further includes a network interface 1340 coupled to the I/O interface 1330.

While FIG. 13 shows the computer system 1300 as a single computing device, in various embodiments the computer system 1300 can include one computing device or any number of computing devices configured to work together as a single computer system 1300.

In various embodiments, the computer system 1300 can be a uniprocessor system including one processor 1310, or a multiprocessor system including several processors 1310 (e.g., two, four, eight, or another suitable number). The processor(s) 1310 can be any suitable processor(s) capable of executing instructions. For example, in various embodiments, the processor(s) 1310 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 1310 can commonly, but not necessarily, implement the same ISA.

The system memory 1320 can store instructions and data accessible by the processor(s) 1310. In various embodiments, the system memory 1320 can be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within the system memory 1320 as security investigation service code 1325 (e.g., executable to implement, in whole or in part, the security investigation service 110) and data 1326.

In some embodiments, the I/O interface 1330 can be configured to coordinate I/O traffic between the processor 1310, the system memory 1320, and any peripheral devices in the device, including the network interface 1340 and/or other peripheral interfaces (not shown). In some embodiments, the I/O interface 1330 can perform any necessary protocol, timing, or other data transformations to convert data signals from one component (e.g., the system memory 1320) into a format suitable for use by another component (e.g., the processor 1310). In some embodiments, the I/O interface 1330 can include support for devices attached through various types of peripheral buses, such as a variant of the Peripheral Component Interconnect (PCI) bus standard or the Universal Serial Bus (USB) standard, for example. In some embodiments, the function of the I/O interface 1330 can be split into two or more separate components, such as a north bridge and a south bridge, for example. Also, in some embodiments, some or all of the functionality of the I/O interface 1330, such as an interface to the system memory 1320, can be incorporated directly into the processor 1310.

The network interface 1340 can be configured to allow data to be exchanged between the computer system 1300 and other devices 1360 attached to a network or networks 1350, such as other computer systems or devices as illustrated in FIG. 1, for example. In various embodiments, the network interface 1340 can support communication via any suitable wired or wireless general data networks, such as types of Ethernet network, for example. Additionally, the network interface 1340 can support communication via telecommunications/telephony networks, such as analog voice networks or digital fiber communications networks, via storage area networks (SANs), such as Fibre Channel SANs, and/or via any other suitable type of network and/or protocol.

In some embodiments, the computer system 1300 includes one or more offload cards 1370A or 1370B (including one or more processors 1375, and possibly including the one or more network interfaces 1340) that are connected using the I/O interface 1330 (e.g., a bus implementing a version of the Peripheral Component Interconnect—Express (PCI-E) standard, or another interconnect such as a QuickPath interconnect (QPI) or UltraPath interconnect (UPI)). For example, in some embodiments the computer system 1300 can act as a host electronic device (e.g., operating as part of a hardware virtualization service) that hosts compute resources such as compute instances, and the one or more offload cards 1370A or 1370B execute a virtualization manager that can manage compute instances that execute on the host electronic device. As an example, in some embodiments the offload card(s) 1370A or 1370B can perform compute instance management operations, such as pausing and/or un-pausing compute instances, launching and/or terminating compute instances, performing memory transfer/copying operations, etc. These management operations can, in some embodiments, be performed by the offload card(s) 1370A or 1370B in coordination with a hypervisor (e.g., upon a request from a hypervisor) that is executed by the other processors 1310A-1310N of the computer system 1300. However, in some embodiments the virtualization manager implemented by the offload card(s) 1370A or 1370B can accommodate requests from other entities (e.g., from compute instances themselves), and can not coordinate with (or service) any separate hypervisor.

In some embodiments, the system memory 1320 can be one embodiment of a computer-accessible medium configured to store program instructions and data as described above. However, in other embodiments, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 1300 via the I/O interface 1330. A non-transitory computer-accessible storage medium can also include any volatile or non-volatile media such as RAM (e.g., SDRAM, double data rate (DDR) SDRAM, SRAM, etc.), read only memory (ROM), etc., that can be included in some embodiments of the computer system 1300 as the system memory 1320 or another type of memory. Further, a computer-accessible medium can include transmission media or signals such as electrical, electromagnetic, or digital signals, conveyed via a communication medium such as a network and/or a wireless link, such as can be implemented via the network interface 1340.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C # or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments can be practiced without the specific details. Furthermore, well-known features can be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 1218A-1218N) can be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various embodiments.

References to "one embodiment," "an embodiment," "an example embodiment," etc., indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given embodiment requires at least one of A, at least one of B, and at least one of C to each be present.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

The specification and drawings are, accordingly, to be regarded in an illustrative rather than a restrictive sense. It will, however, be evident that various modifications and changes can be made thereunto without departing from the broader spirit and scope of the disclosure as set forth in the claims.

What is claimed is:

1. A computer-implemented method comprising:
   obtaining, from one or more services of a multi-tenant provider network, artifacts resultant from network activity involving a resource, of a user, hosted by the multi-tenant provider network;
   detecting, based at least in part on an analysis of one or more of the artifacts and historic activity involving the resource, activity indicative of a potential compromise associated with a client acting as a source of at least some of the network activity;
   determining, based on the artifacts, that one or more Application Programming Interface (API) calls originated by the client utilize API methods that exist within a set of known API methods included in a formal model of attack tactics;
   identifying, based on the network activity, one or more attack tactics;
   responsive to both the detecting of the activity indicative of a potential compromise and the determining that the one or more API calls utilize API methods that exist within a set of known API methods, executing an investigative playbook comprising a plurality of logical tests, based on the artifacts, to generate an attack report, the attack report identifying the one or more attack tactics and providing one or more suggested analysis or remediation actions to be performed, within the provider network, to protect against the one or more attack tactics;

causing the attack report to be presented via a user interface; and causing the user interface to display a graph, generated based on the attack report, to be presented, wherein the graph illustrates one or more clusters, each cluster corresponding to a detected attack tactic and including representations of a set of API call methods.

2. The computer-implemented method of claim 1, wherein detecting the activity indicative of a potential compromise includes one of:

determining that the client is associated with a geolocation, network, or user agent that has not been observed in association with the resource over a recent period of time.

3. The computer-implemented method of claim 1, wherein detecting the activity indicative of a potential compromise includes one of:

obtaining, from a service of the provider network, a security finding associated with the resource; or determining that a configuration associated with the resource is improper.

4. A computer-implemented method comprising:

detecting, in association with a resource of a provider network, activity indicative of a potential compromise;

determining, based on the activity, that one or more Application Programming Interface (API) calls originated by a client utilize API methods that exist within a set of known API methods included in a formal model of attack tactics;

responsive to both the detecting of the activity indicative of a potential compromise and the determining that one or more API calls utilize API methods that exist within a set of known API methods, executing an investigative playbook comprising a plurality of logical tests, based on the activity, to generate an attack report;

causing the attack report to be presented via a user interface; and causing a user interface to display a graph, generated based on the attack report, to be presented, wherein the graph illustrates one or more clusters, each cluster corresponding to a detected attack tactic and including representations of a set of API call methods, observed in network traffic, associated with the detected attack tactic.

5. The computer-implemented method of claim 4, wherein detecting the activity indicative of a potential compromise includes:

determining that the client is associated with a geolocation, network, or user agent that has not been observed in association with the resource over a recent period of time.

6. The computer-implemented method of claim 4, wherein detecting the activity indicative of a potential compromise includes:

obtaining, from a service of the provider network, a security finding associated with the resource; or determining that a configuration associated with the resource is improper.

7. The computer-implemented method of claim 4, wherein each of the set of known API methods is valid for use within the provider network.

8. The computer-implemented method of claim 4, wherein the plurality of logical tests of the investigative playbook comprise determining whether the one or more API calls have been originated, within a recent window of time, from other locations.

9. The computer-implemented method of claim 8, wherein the plurality of logical tests of the investigative playbook further comprise determining whether a location associated with the client was also associated with other clients of a same organizational account as that of the client.

10. The computer-implemented method of claim 9, wherein the plurality of logical tests of the investigative playbook further comprise determining whether a network address utilized by the client is a known or predicted malicious address.

11. The computer-implemented method of claim 10, wherein the plurality of logical tests of the investigative playbook further comprise determining whether other user accounts utilized the same network address as utilized by the client.

12. The computer-implemented method of claim 4, wherein the attack report identifies a specific attack tactic detected based on network traffic.

13. The computer-implemented method of claim 4, further comprising:

determining a remediation action to be performed, within the provider network, to address a specific attack tactic detected based on network traffic; and performing the remediation action.

14. A system comprising:

a first one or more electronic devices comprising one or more hardware processors to implement a first service in a multi-tenant provider network, the first service to host or provide a resource for a user; and a second one or more electronic devices comprising one or more hardware processors to implement a security investigation service in the multi-tenant provider network, the security investigation service including instructions that, upon execution, cause the security investigation service to:

detect, in association with the resource, activity indicative of a potential compromise;

determine, based on the activity, that one or more Application Programming Interface (API) calls originated by a client utilize API methods that exist within a set of known API methods included in a formal model of attack tactics;

responsive to both the detection of the activity indicative of a potential compromise and the determination that one or more API calls utilize API methods that exist within a set of known API methods, execute an investigative playbook comprising a plurality of logical tests, based on the activity, to generate an attack report;

cause the attack report to be presented via a user interface; and cause a user interface to display a graph, generated based on the attack report, to be presented, wherein the graph illustrates one or more clusters, each cluster corresponding to a detected attack tactic and including representations of a set of API call methods, observed in network traffic, associated with the detected attack tactic.

15. The system of claim 14, wherein to detect the activity indicative of a potential compromise, the security investigation service is to:

determine that the client is associated with a geolocation, network, or user agent that has not been observed in association with the resource over a recent period of time.

16. The system of claim 14, wherein to detect the activity indicative of a potential compromise, the security investigation service is to:
  obtain, from a second service of the provider network, a security finding associated with the resource; or
  determine that a configuration associated with the resource is improper.

17. The system of claim 14, wherein the attack report identifies a specific attack tactic detected based on network traffic.

18. The system of claim 14, wherein the security investigation service further includes instructions that upon execution cause the security investigation service to:
  determine a remediation action to be performed, within the provider network, to address a specific attack tactic detected based on network traffic; and
  cause the remediation action to be performed.

19. The method of claim 4, wherein the attack report and the graph are presented concurrently in the same user interface.

20. The system of claim 14, wherein the attack report and the graph are presented concurrently in the same user interface.

* * * * *